UNITED STATES PATENT OFFICE.

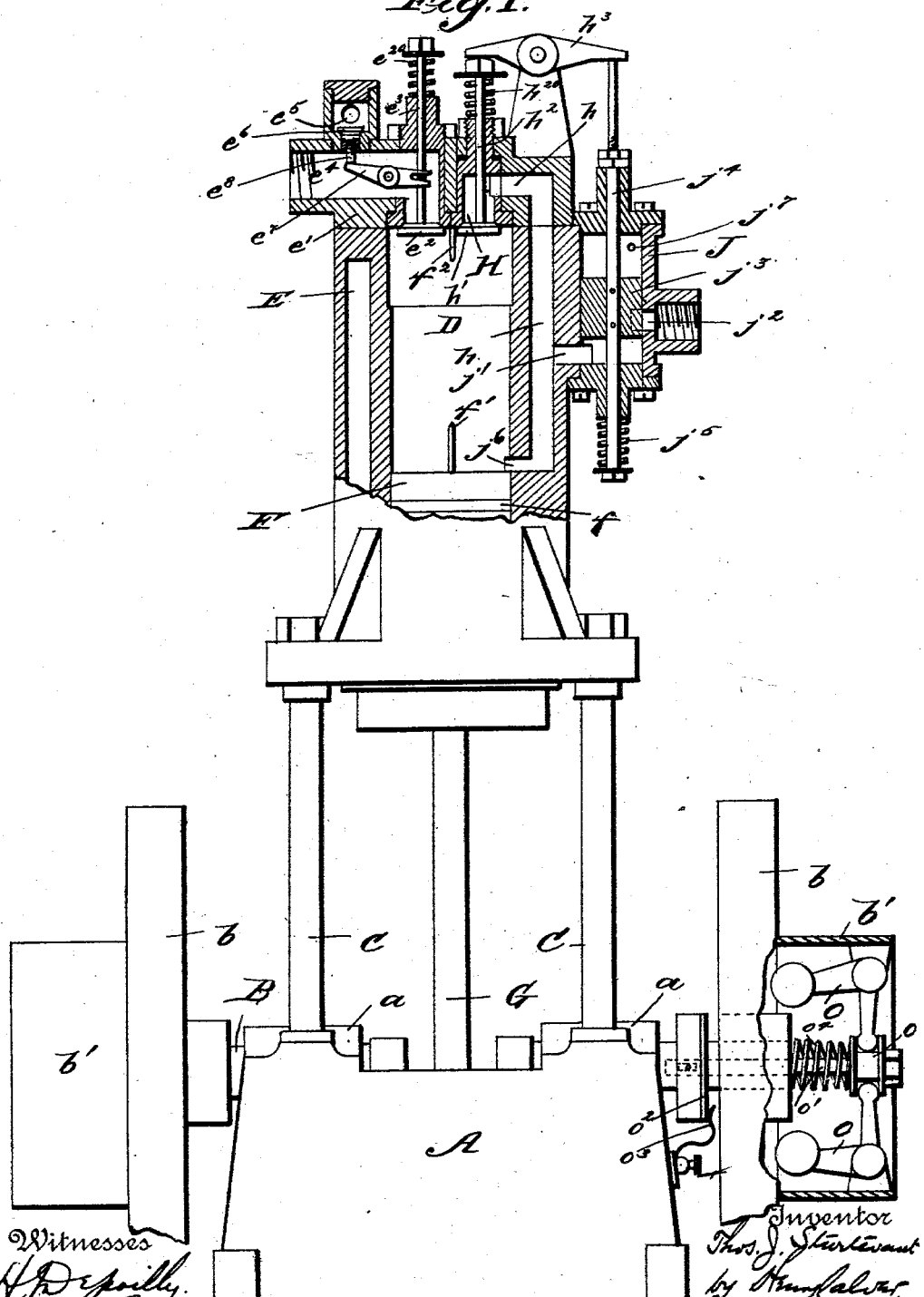

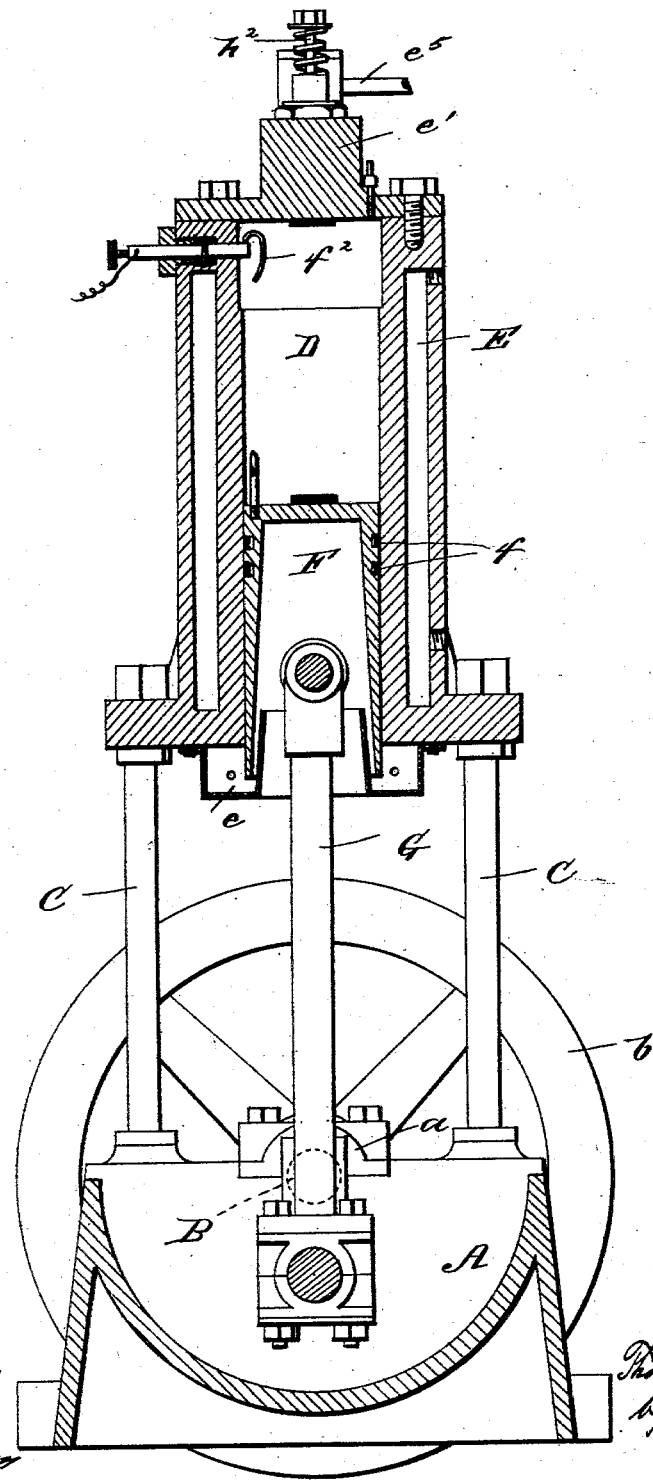

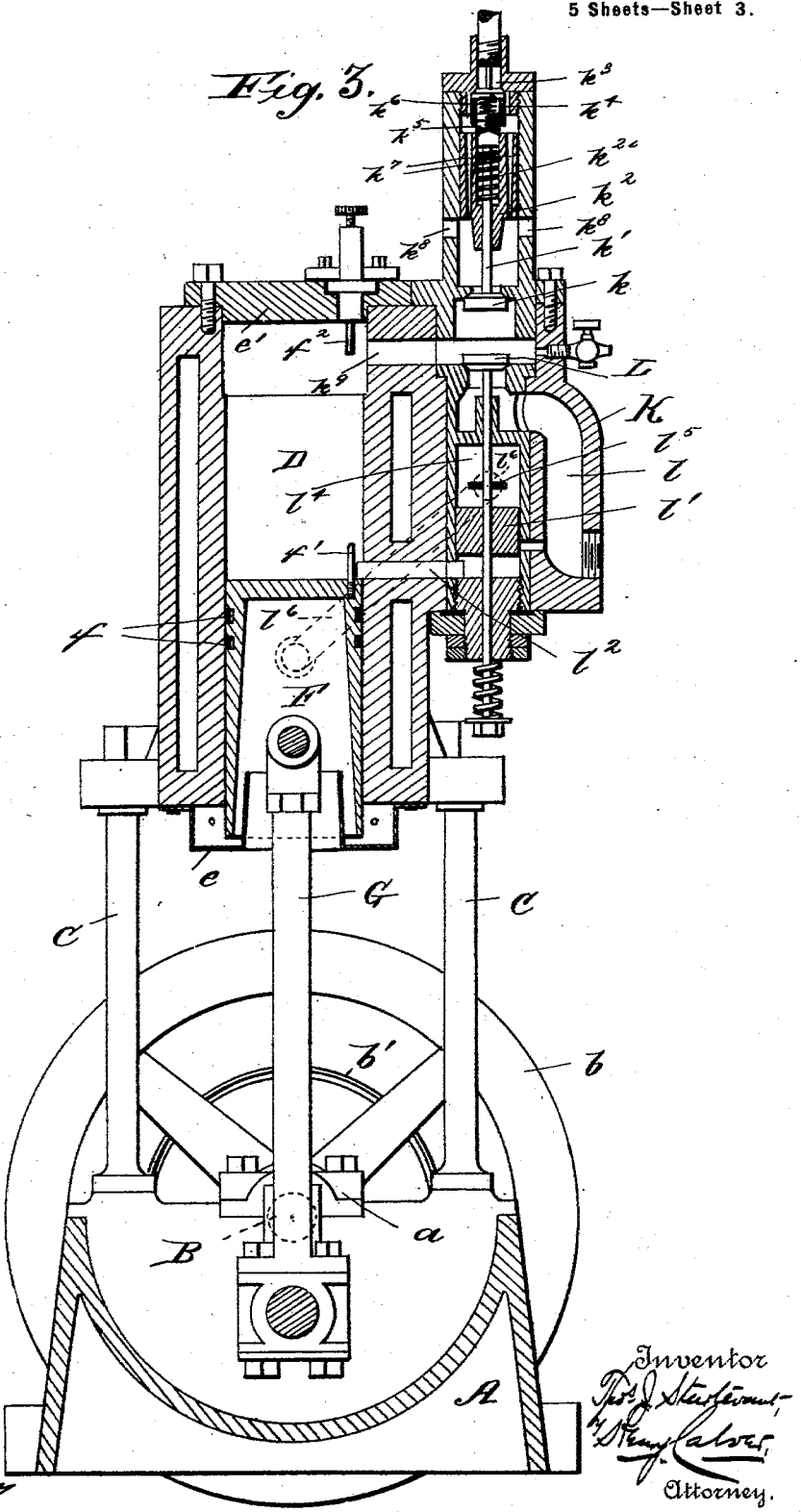

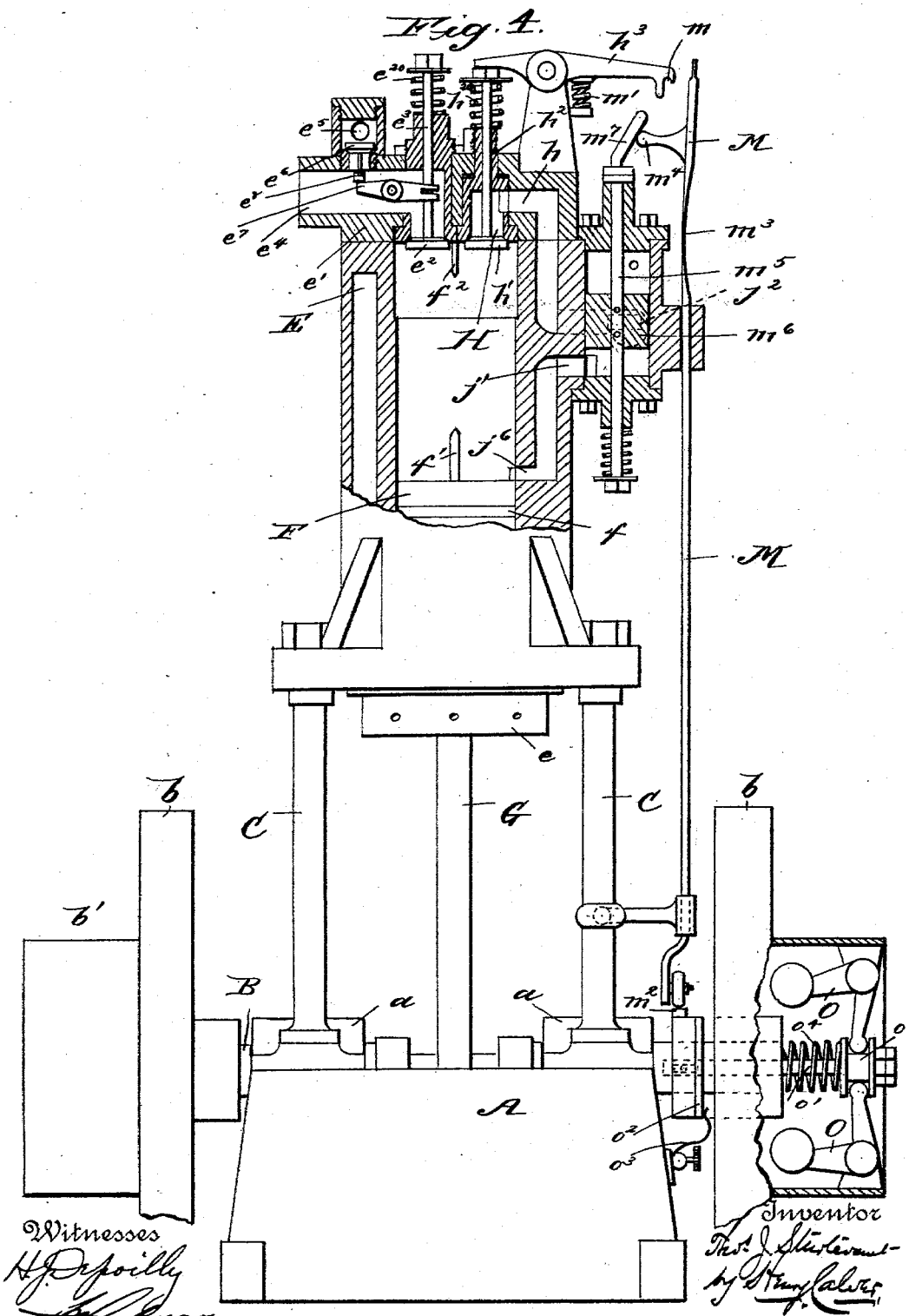

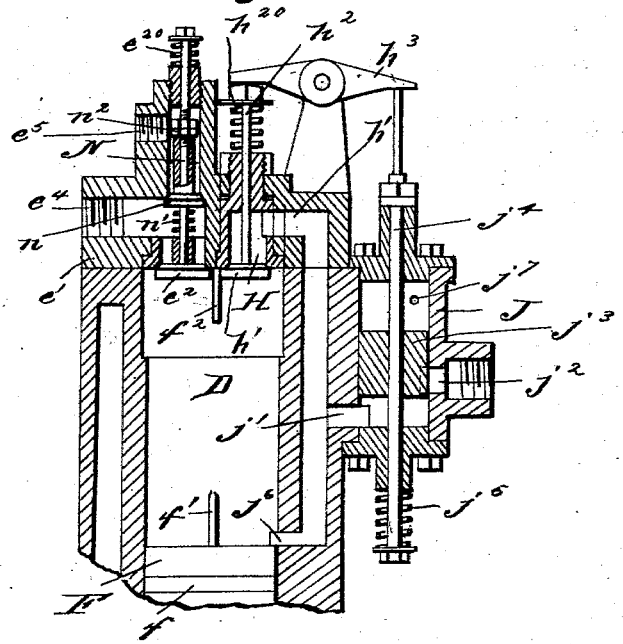
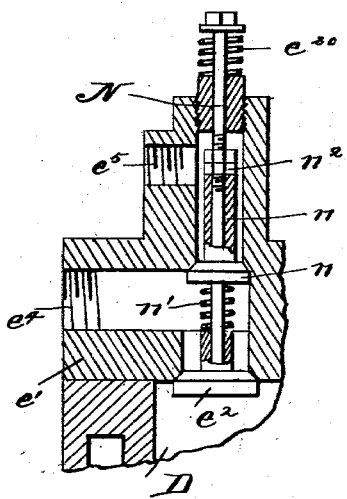
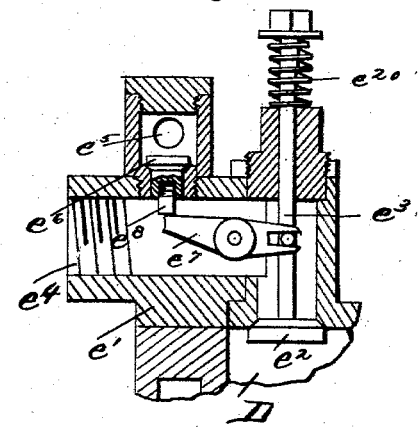

THOMAS J. STURTEVANT, OF FRAMINGHAM, MASSACHUSETTS.

GAS-ENGINE.

SPECIFICATION forming part of Letters Patent No. 634,509, dated October 10, 1899.

Application filed May 13, 1898. Serial No. 680,552. (No model.)

*To all whom it may concern:*

Be it known that I, THOMAS J. STURTEVANT, a citizen of the United States, residing at Framingham, in the county of Middlesex and State of Massachusetts, have invented certain new and useful Improvements in Gas-Engines, of which the following is a specification, reference being had therein to the accompanying drawings.
My invention relates to gas-engines in which the expansive properties of gas, commingled air and gas, or vaporized hydrocarbon are utilized to move the piston and drive the crank-shaft of the engine, the particular type of engine to which my invention belongs being that class known as "explosive-engines," so called for the reason that the gas which is utilized to drive the piston is expanded by being exploded at predetermined times and under certain conditions, so as to produce a power-stroke of the piston.

The present invention relates specifically to the inlet and exhaust valves and their controlling mechanism, and particularly to the exhaust mechanism, it being of prime importance in engines of this type that the mechanism for clearing the engine-cylinder of the burned gases and products of combustion be rapid and efficient in its action. The exhaust mechanism which I have invented and which forms the subject-matter of this application is of such construction and so arranged relative to the other working parts of the engine that the exhaust-valve and its coöperating devices are only active immediately after an explosion has taken place in the engine-cylinder or piston-chamber, said valve and its controlling mechanism being quiescent during the time when the engine may be running under so light a load that the automatic ignition devices such as are commonly used cause no explosion and consequent power-stroke. One advantage of such an arrangement of exhaust mechanism over the type of exhaust in which the valve is opened at fixed intervals no matter under what conditions the engine may be running, is that the valves are only active and subjected to wear at the time when they are actually needed. A second advantage is that when the engine is running light it may make eight or ten strokes, alternately compressing and expanding the gas in the piston-chamber, without an explosion and power-stroke, the exhaust-valve during this time remaining closed, thereby preventing the escape and wasting of the gas or fuel which has been drawn into the piston-chamber, but not exploded. It will be apparent that with this arrangement of exhaust mechanism if a load is suddenly thrown on the engine when it is running light and has made four or more strokes—*i. e.*, two or more reciprocations—since the last explosion the first downstroke will be a power-stroke, as the charge of unexploded gas is held in the chamber by the exhaust mechanism and it is unnecessary to wait until the piston has made its intake-stroke and its compression-stroke before a power-stroke can be obtained, as in some types of engines now in use. In prior constructions this delay in the power-stroke results in a very appreciable slowing down of the engine under its increased load and wide variations of speed result before the governor acts to permit the occurrence of a power cycle.

By the use of my improved exhaust mechanism a close regulation of speed is obtainable and the governor need only be utilized to control the ignition of the charges.

In the drawings which accompany and form a part of this specification, Figure 1 is a central vertical section of a gas-engine embodying my improvements. Fig. 2 is a similar view taken in a plane at right angles to the plane of the section in Fig. 1. Fig. 3 is a view similar to Fig. 1, but showing a slightly-different form of my invention. Fig. 4 shows another form of valve mechanism. Fig. 5 is a detail view of the upper portion of the piston-chamber, showing a slightly-different arrangement of inlet-valve from that shown in the other figures. Figs. 6 and 7 are enlarged detail views of the inlet-valves shown in Figs. 4 and 5.

The engine which I shall now describe in detail, giving particular prominence to the improvements which constitute my invention, resembles in its general structure and characteristics the well-known Otto or four-cycle type of gas-engine, and I have shown in the present drawings the upright or vertical piston type, although it will be understood that my improvements are equally applicable to other types of engines.

Referring to the drawings by letter, A denotes the base of the engine, having suitable bearings $a$ for the crank-shaft B. Said crank-shaft B has the fly-wheels $b$ at either end and both of which may be provided with belt-pulleys $b'$, from which power may be transmitted from the engine to the machine to be driven. Standards or posts C rise from the base A and form supports for the explosion-cylinder D, which in general characteristics is of the usual construction, having the water-jacket E surrounding it to guard against overheating, the oil-pan $e$ at its lower end, and the top or cylinder-head $e'$ at its upper end. Within said water-jacketed explosion-cylinder D slides a motive-piston F of ordinary construction, having the packing-rings $f$ and carrying an electric sparking or ignition device $f'$. Said piston is connected with the crank-shaft B by means of the pitman G. The explosion-chamber D at its upper end is provided with an electric contact-finger $f^2$, which coöperates with the sparking device $f'$, carried by the piston F, to cause a spark and ignite the charge of gas at the proper time.

The engine as described thus far is similar in construction and operation to the Otto type of engine referred to. The said cylinder-head $e'$ in the construction shown in Figs. 1 and 4 is provided with the inlet and exhaust valves and their coöperating elements. The inlet-valve $e^2$ is seated in a suitable valve-seat in the cylinder-head $e'$ and is provided with a stem $e^3$, which passes through the head $e'$ and is surrounded by a spiral spring $e^{20}$, which supports and normally keeps said valve $e^2$ against its seat. Said valve $e^2$ controls the air-passage $e^4$, which passage serves also as a mixing-chamber for the air and gas, the latter entering from the gas-inlet $e^5$, said inlet being controlled by a puppet-valve $e^6$. Said puppet-valve is normally closed by the pressure of gas from the gas-supply pipe and is opened to admit the charge of gas to the air-passage and mixing-chamber $e^4$ when the main inlet-valve $e^2$ is moved from its seat by means of the lever $e^7$, which is pivoted in the passage $e^4$ and connected at its inner end with the valve-stem $e^3$, while its outer end lies just beneath the puppet-valve $e^6$, so as to lift it from its seat when the lever $e^7$ is depressed by the movement of the valve $e^2$. Said puppet-valve $e^6$ is provided with an adjustable screw-threaded plug $e^8$, threaded in the bottom of the valve $e^6$, against which lever $e^7$ strikes, so that the movement of the valve may be varied by adjusting said screw-plug $e^8$, and the volume of gas entering through said gas-inlet $e^5$ may be increased or diminished, as desired.

The main exhaust is through the port H, formed in the head $e'$, which opens into an exhaust-passage $h$. Said port H is closed by the exhaust-valve $h'$, the stem $h^2$ of which passes through the head $e'$ and is surrounded at its upper end by a spring $h^{20}$, which normally upholds the exhaust-valve $h'$ and keeps it in its seat. Said spring is somewhat stronger than the supporting-spring $e^{20}$, which keeps the valve $e^2$ closed, the reason for which will presently appear. A lever $h^3$, pivoted to a support on the cylinder-head $e^2$, bears upon the top of the valve-stem $h^2$ at its inner end, so as to force said stem and its valve $h'$ downward and open the exhaust-port H when the outer end of the lever $h^3$ is raised. The mechanism for throwing said lever $h^3$ and the manner in which it is operated is the particular feature of construction which I deem of considerable importance, as it enables me to get a very close regulation of the speed of the engine and secure an economical consumption of fuel, as outlined hereinbefore. The operating mechanism for throwing the lever $h^3$ to open the exhaust-valve $h'$ comprises the following instrumentalities: A cylinder or auxiliary chamber J is located at one side of the main cylinder or explosion-chamber D and near the upper end thereof, said cylinder J being cast integral with the main cylinder or secured thereto in any suitable manner. The cylinder J communicates with the exhaust-passage $h$, which leads from the exhaust-port H by means of a port $j'$, and a second port $j^2$, out of line and a little above the port $j'$, forms an opening, through which the cylinder J communicates with the atmosphere or a suitable discharge-pipe for the exhaust products of the engine. Within the cylinder J is a piston $j^3$, carrying a piston-rod $j^4$, the upper end of which passes out through the upper head of the chamber J and bears against the outer end of lever $h^3$, so that when the piston $j^3$ is raised the lever $h^3$ is operated and the exhaust $h'$ is opened. The lower end of piston-rod $j^4$ passes through the lower head of cylinder J and is surrounded by a spiral spring $j^5$, which keeps said piston $j^3$ normally in its lowest position and the port $j^2$ closed. Said piston $j^3$ does not descend to the bottom of the auxiliary chamber J, but leaves port $j'$ open and a small portion of the chamber J beneath the piston $j^3$, with which port $j'$ communicates, unoccupied.

The exhaust-passage $h$ opens into the main explosion-chamber D at a point just above the lowermost position of the piston F through the auxiliary exhaust-port $j^6$, as clearly shown in Figs. 1 and 3. A small aperture $j^7$ in the chamber J allows the air above piston $j^3$ to escape comparatively slowly when the piston is raised, the slowly-escaping air making a cushion for the piston $j^3$ and preventing its sudden or violent movement during the period of exhaust.

The working parts of the engine illustrated in Figs. 1 and 2 having been described, I will state the operation of the same before referring to the forms of engine shown in Figs. 3 and 4, which forms are in general similar in operation to the type just described.

The main or motive piston F' being at the upper end of its stroke and the several valves closed, the driving-shaft is revolved, so as to carry the piston downward and cause it to make its suction or intake stroke. The exhaust-valve $h'$, being upheld by a spring stronger than the pull of the vacuum caused by the downstroke of the piston, remains closed; but the inlet-valve $e^2$ is opened against the force of its spring, and as it descends actuates the lever $e^7$, controlling the puppet-valve $e^6$, throwing the latter open, so as to admit the supply of gas necessary for the charge, and the commingled air and gas then passes from the air-passage through the inlet-valve $e^2$ into the explosion-cylinder. The continued revolution of the driving-shaft gives an upstroke to the piston D, compressing the charge of fuel which was drawn into the cylinder on the intake-stroke, and when the piston reaches its uppermost position the electric igniting devices contact, a spark is generated, the compressed charge of fuel exploded, and the first power-stroke is given to the piston. As the piston reaches its lowermost position on its power-stroke it uncovers the auxiliary exhaust-port $j^6$ and the expanded and burned gases in the explosion-cylinder rush into the passage $h$ through the port $j'$, beneath the piston $j^3$, and raise the latter, the air-cushion above said piston preventing its hammering by reason of its sudden movement, although said air-cushion does not prevent a comparatively-rapid movement of the piston. As the piston $j^3$ rises in its chamber it uncovers the outer port $j^2$ and allows the products of combustion to escape to the outer air or into a suitable eduction-pipe. When piston $j^3$ is raised by the exhaust-gases from the main cylinder, the upper end of its piston-rod $j^4$ actuates the lever $h^3$ and forces the main exhaust-valve $h'$ from its seat. The piston F has but a momentary dwell at its lowermost position after the power-stroke, and yet quite a large percentage of the burned gases can escape through the auxiliary port $j'$ before it is closed by the expelling upstroke of the piston. The main exhaust-valve having been opened, however, the products of combustion are forced out through the main exhaust-port H by piston F through the passage $h$, beneath the piston $j^3$, and escape. The area of piston $j^3$ being greater than that of the exhaust-valve $h'$ and the surface pressure on both being equal, the piston $j^3$ will remain in its raised position and keep the said valve open until the main piston F has reached its uppermost position, cleared the explosion-chamber of the burned gases, and the pressure upon valve $h'$ and piston $j^3$ becomes $nil$. The spring at the lower end of piston-rod $j^4$, together with atmospheric pressure above piston $j^3$, will immediately throw the latter to its lowermost position, relieving exhaust-valve $h$ from the pressure of its actuating-lever $h^3$ and allowing its spring to close it, and the piston F then begins its second intake-stroke.

In the form of the invention shown in Fig. 3 the disposition of the inlet and exhaust valves relative to each other and the main cylinder is somewhat different from that represented in Fig. 1. Both the said valves are mounted in an auxiliary offset-chamber K and are placed in line with each other and working in opposite directions instead of being placed side by side and moving in the same direction, as in Fig. 1. The inlet-valve $k$ controls the air and gas supply, as in the other construction, but by different means. The stem $k'$ of valve $k$ slides in a support $k^2$ in the upper portion of the auxiliary chamber K and is normally closed by a spiral spring $k^{20}$. The end of stem $k'$ of the inlet-valve bears against the bottom of a puppet-valve $k^3$, which controls the gas-inlet, said puppet-valve being a two-part valve composed of a shell $k^4$ and block $k^5$, sliding within the same, a spring $k^6$ keeping the parts separated and insuring the close fitting of the valve $k^3$. The gas entering through the valve $k$ passes down through the passages $k^7$ in the block $k^2$ in the form of jets and mingles with the air entering the air-inlets $k^8$ in the sides of the chamber K, the charge then passing through the valve $k$ and into the explosion-cylinder by means of the port $k^9$. The exhaust-valve L is seated just below and opposite inlet-valve $k$ and communicates with the port $k^9$, closing the passage between this port and the outer exhaust-passage $l$. The valve L is controlled by means of a piston $l'$, which is actuated by the exhaust-gases passing beneath it through auxiliary port $l^2$ after a power-stroke has occurred in a manner similar to that described in connection with the form of the invention shown in Fig. 1. The main exhaust-valve L is held open after the auxiliary port $l^2$ is closed by the piston F by means of the following instrumentalities: The piston-chamber $l^4$ is provided with a check-valve $l^5$, which opens outwardly and allows the air to escape slowly from the chamber $l^4$ as the piston $l'$ is raised by the rush of the burned gases through the port $l^2$, so as to cushion the piston in a manner already described. Said chamber $l^4$ is also connected by means of a pipe $l^6$ with the explosion-chamber D, said pipe $l^6$ entering chamber D at a point which is just below the lower end of piston F when the latter is in its uppermost position. It will be seen that pipe $l^6$ is closed by piston F at all times except when the said piston is in its uppermost position, so that any tendency of the piston $l'$ to return to its normal position and close the main exhaust-valve L will create a vacuum in the piston-chamber $l^4$ sufficient to cause the piston $l'$ and valve L to remain in their raised and open positions. The vacuum thus formed in chamber $l^4$ is only broken when the piston F reaches the extreme upward limit of its expelling stroke. At this point the piston F uncovers the end of pipe $l^6$, establishes communication with chamber $l^4$, breaks the vacuum, and allows the piston $l'$ to descend and close the main exhaust-valve L before the piston F begins its intake-stroke.

The engine shown in Fig. 4 is identical in construction and operation to that shown in Fig. 1, with the exception that the exhaust-valve is operated in a somewhat different manner. The lever $h^3$, which actuates the exhaust-valve, is provided with a notch $m$ at its outer end and is normally held in the position shown in full lines in Fig. 4 by means of a spring $m'$. A thrust-rod M, sliding in suitable bearing on the frame of the engine, is actuated at regular intervals by a cam $m^2$ on the crank-shaft B. The upper end of said thrust-rod M is of thin spring metal, as shown at $m^3$, and the said rod is also provided with an inwardly-projecting striker or finger $m^4$. The stem $m^5$ of the piston $m^6$ has an inclined upper end $m^7$, against which the finger $m^4$ on the thrust-rod M strikes when the piston is in its lower or normal position. When the finger $m^4$ strikes the inclined end $m^7$ of the piston-stem $m^5$, the spring portion $m^3$ of the thrust-rod M yields, and the upper end of the thrust-rod is forced away from the valve-actuating lever $h^3$, and the exhaust-valve $h'$ remains closed. When the piston $m^5$ is raised by the exhaust-gases from the explosion-cylinder in the manner already described, it carries the inclined end $m^7$ out of the path of the finger $m^5$, so that the rod M makes a straight thrust, engaging the notch $m$ in the end of lever $h^3$ and opening the valve $h'$. The piston $m^5$ remains raised as long as any exhaust-gases are passing from the cylinder, being upheld not only by the exhaust-gases, but also by the finger $m^4$, as shown in dotted lines in Fig. 4, and the thrust-rod-actuating cam $m^2$ is so timed as to hold the rod M in its raised and operative position until the expelling stroke of piston F is completed. When the exhaust is finished, the thrust-rod M drops to its normal position, releasing the exhaust-valve $h'$ and allowing it to close. The piston $m^5$ then falls to its lowest position, so that its inclined upper end $m^6$ will be in the path of the finger $m^4$ of the spring thrust-rod to divert it and render it inactive until the next explosion occurs.

It will be seen that in the construction just described while the exhaust-valve is operated directly from the crank-shaft it is controlled by the exhaust from the main cylinder, so that no exhaustion of the contents of the explosion-chamber can occur until a charge has been fired and a power-stroke taken place. This construction is especially adapted for engines of large size in which it would be necessary to provide an exhaust-valve-controlling piston of considerable size to open the exhaust-valve if the piston acted directly on the said valves. By interposing the thrust-rod mechanism, however, a piston of comparatively small size may be used, as it requires very little power to control the action of the thrust-rod.

In Fig. 5 I have shown an inlet-valve of slightly different construction from those already described. In this form of the invention the main-valve stem N carries the valve $n$, which controls the gas-inlet, said valve $n$ being closed by means of a spring $n'$, resting upon the spider, through which the valve-stem N passes. When the main inlet-valve is opened by the suction of the piston F on its intake-stroke, a nut $n^2$ on the stem N forces the gas-valve $n$ from its seat and allows the ingress of the gas. The nut $n^2$ is adjustable, so that the extent of movement of the valve $n$ and the flow of gas may be regulated.

In all the forms of engine which I have shown and described it will be seen that I have utilized the exhaust to control the main exhaust-valve and that only after an explosion has occurred and it is necessary to clear the main cylinder of the products of combustion does any action of the exhaust mechanism take place. This arrangement is, as stated, very advantageous, for the reason that unnecessary friction and wearing of the valves are avoided, the waste of fuel by its escape through the exhaust-valve when no explosion has taken place is obviated, and a very close regulation of the speed of the engine can be obtained, thus obviating the use of a speed-governor other than the governor for the ignition devices, and wide variations in the speed of the engine incident to the sudden addition of a load when the engine is running light are done away with.

The governor for the ignition devices is of ordinary construction and, as shown in the several figures, consists of the weighted arms O, pivoted to the belt-pulley $b'$, which engage the collar $o$ on the sliding rod $o'$. The rod $o'$ carries the contact-plate $o^2$ at its inner end, which plate makes contact with the spring-finger $o^3$, said finger being in electrical connection with the sparking device $f'$, carried by the piston, and a suitable battery or source of electrical supply. The contact-finger $f^2$ in the explosion-chamber D is also in circuit with the sparking device $f'$ and the source of electrical supply, so that as long as electrical connection is maintained between contact-plate $o^2$ and finger $o^3$ sparking and ignition of the charge will occur when contact is made between fingers $f'$ and $f^2$. When the speed of the engine passes a certain limit, however, the arms O are thrown out by centrifugal force, the plate $o^2$ is moved away from finger $o^3$, and the electrical circuit is broken, thus preventing further explosions until the speed of the engine allows the spring $o^4$ to return contact-plate $o^2$ to its normal position.

Having thus described my invention, I claim and desire to secure by Letters Patent—

1. In an explosive-engine, the combination with an explosion-cylinder, of an inlet-valve for said cylinder, an exhaust-valve, an auxiliary chamber through which the exhaust-gases from said explosion-chamber pass, a piston within said auxiliary chamber controlling the escape of the exhaust-gases, connections between said piston and said exhaust-valve whereby the movements of the said valve are controlled by the said piston, and connections between said explosion-chamber and said valve-controlling piston so that said piston is operated only after each power-stroke of the engine.

2. In an explosive-engine, the combination with an explosion-cylinder of an inlet-valve, a main exhaust-port, a valve controlling the latter, an auxiliary exhaust-port, an auxiliary chamber through which the exhaust from both ports passes, and means within said auxiliary chamber, actuated by the exhaust from said auxiliary port, to operate said exhaust-valve and open the main exhaust-port.

3. In an explosive-engine, the combination with the explosion-cylinder, of an inlet-valve, a main exhaust-port, a valve controlling the same, an auxiliary exhaust-port controlled by the motive piston of the engine, an auxiliary chamber through which the exhaust from both ports passes, and means within said chamber, actuated by the exhaust from said auxiliary port, to operate said exhaust-valve and open the main exhaust-port.

4. In an explosive-engine, the combination with an explosion-chamber, of an inlet-valve, a main exhaust-port, a valve controlling the latter, an auxiliary exhaust-port controlled by the motive piston of the engine, a piston-chamber through which the exhaust from both ports passes, a piston within said chamber actuated by the exhaust from said auxiliary port, and connections between said piston and main exhaust-valve by means of which the said valve is operated and the main exhaust-port opened after each power-stroke of the piston.

5. In an explosive-engine, the combination with an explosion-cylinder, of an inlet-valve, a main exhaust-port, a valve controlling the latter, an auxiliary exhaust-port controlled by the motive piston of the engine, an auxiliary chamber provided with a port communicating with said explosion-chamber, an outer exhaust-port in said auxiliary chamber, a piston within said chamber normally closing said outer exhaust-port operated by the auxiliary exhaust from said explosion-chamber, and connections between said piston and the main exhaust-valve by means of which the latter is opened by the movement of said piston.

6. In an explosive-engine, the combination with an explosion-cylinder, of an inlet-valve, a main exhaust-port, a valve controlling said port, an auxiliary exhaust-port controlled by the motive piston of the engine, an auxiliary chamber into which said main and auxiliary ports exhaust, said auxiliary chamber being provided with an outer exhaust-port, a piston within said chamber normally closing said outer port actuated by the exhaust from said auxiliary port, and connections between said piston and exhaust-valve to operate said valve and open the main exhaust-port.

7. In an explosive-engine, the combination with an explosion-chamber, of an inlet-valve for said explosion-chamber, a main exhaust-port, an auxiliary exhaust-port, an auxiliary chamber communicating with said explosion-chamber through which the exhaust-gases from said explosion-chamber pass, a piston within said auxiliary chamber actuated by the exhaust-gases from said explosion-chamber and controlling the escape of the exhaust-gases, connections between said piston and the valve controlling said main exhaust-port, whereby said valve is operated by said piston, and means to keep said piston normally in inoperative position.

8. In an explosive-engine, the combination with an explosion-chamber, of an inlet-valve for said explosion-chamber, a main exhaust-port, an auxiliary exhaust-port, an auxiliary chamber communicating with said explosion-chamber through which the exhaust-gases from said explosion-chamber pass, a piston within said auxiliary chamber actuated by the exhaust-gases from said explosion-chamber and controlling the escape of the exhaust-gases, connections between said piston and the valve controlling said main exhaust-port whereby said valve is operated by said piston, and a spring to keep said piston normally in an inoperative position.

9. In an explosive-engine, the combination with an explosion-chamber, of an inlet-valve, a main exhaust-port, a valve controlling said port, an auxiliary exhaust-port controlled by the motive piston of the engine, an auxiliary chamber into which said main and exhausts ports discharge, said chamber being provided with an outer exhaust-port, a piston within said auxiliary chamber controlling said outer exhaust-port actuated by the exhaust from said auxiliary port, connections between said piston and the main exhaust-valve to operate the latter when the piston is actuated, and a spring to keep said piston normally depressed and the outer exhaust-port of the said auxiliary chamber closed.

10. In an explosive-engine, the combination with an explosion-cylinder, of an inlet-valve, a main exhaust-port, a valve controlling said port, an auxiliary exhaust-port controlled by the motive piston of the engine, a passage into which both said main and auxiliary ports discharge, an auxiliary chamber having a port opening into said exhaust-passage and an outer exhaust-port, a piston in said chamber normally closing said outer exhaust-port operated by the exhaust-gases from said explosion-chamber and connections between said piston and main exhaust-valve to open the latter when the piston is raised.

11. In an explosive-engine, the combination with an explosion-cylinder, of an inlet-valve, a main exhaust-port, a valve controlling said port, an auxiliary exhaust-port controlled by the motive piston of the engine, a passage into which both said main and auxiliary ports discharge, an auxiliary chamber having a port opening into said exhaust-passage and an outer exhaust-port, a piston in said chamber normally closing said outer exhaust-port operated by the exhaust-gases from said explosion-chamber, connections between said piston and main exhaust-valve to open the latter when the piston is raised, said piston being maintained in raised position during the expelling stroke of the motive piston by the exhaust from the explosion-chamber.

12. In an explosive-engine, the combination with an explosion-chamber provided with an inlet-port and suitable exhaust-ports, of a main inlet-valve controlling the inlet-passage to said explosion-chamber, an air-passage controlled by said main inlet-valve, a gas-inlet, a gas-valve controlling the said gas-inlet, connections between said main valve and the gas-valve whereby the latter is opened when the main inlet-valve is actuated, and means for adjusting said valve connections to vary the movement of the gas-valve and thereby increase or diminish the volume of gas.

13. In an explosive-engine, the combination with an explosion-chamber provided with an inlet-port and suitable exhaust-ports, of a main inlet-valve controlling the inlet-passage to said explosion-chamber, an air-passage controlled by said main inlet-valve, a gas-inlet, a gas-valve normally closed by gas-pressure controlling said gas-inlet, connections between said main inlet-valve and the said gas-valve whereby the latter is opened when said main valve is actuated, and means for adjusting said valve connections to vary the movement of the gas-valve and thereby increase or diminish the volume of gas.

14. In an explosive-engine, the combination with an explosion-chamber provided with an inlet-port and suitable exhaust-ports, of a main inlet-valve controlling the inlet-passage to said explosion-chamber, an air-passage controlled by said main inlet-valve, a spring to normally keep said valve closed, a gas-inlet opening into said air-passage, a puppet-valve normally closed by gas-pressure controlling the gas-supply, and a lever operated by the main valve to open said puppet-valve, said puppet-valve having an adjustable portion against which said lever strikes, whereby the movement of said puppet-valve may be varied and the volume of gas increased or diminished.

In testimony whereof I affix my signature in the presence of two witnesses.

THOMAS J. STURTEVANT.

Witnesses:
 CHARLES F. HALL,
 LLOYD MAKEPEACE.